United States Patent [19]

Benham et al.

[11] Patent Number: 5,237,025

[45] Date of Patent: Aug. 17, 1993

[54] PROCESS FOR MAKING BIMODAL POLYOLEFINS USING TWO INDEPENDENT PARTICULATE CATALYSTS

[75] Inventors: Elizabeth A. Benham; Max P. McDaniel, both of Bartlesville, Okla.

[73] Assignee: Phillips Petroleum Company, Bartlesville, Okla.

[21] Appl. No.: 594,600

[22] Filed: Oct. 9, 1990

[51] Int. Cl.$^5$ .................. C08F 4/642; C08F 210/02
[52] U.S. Cl. ................... 526/114; 526/97; 526/125; 526/129; 526/348.5; 526/904; 502/110; 502/113
[58] Field of Search .............. 526/97, 119, 105, 125, 526/114, 904, 129; 502/110, 113

[56] References Cited

U.S. PATENT DOCUMENTS

| | | | |
|---|---|---|---|
| 3,622,521 | 11/1971 | Hogan et al. | 252/430 |
| 4,041,224 | 8/1977 | Hoff et al. | 526/96 |
| 4,218,339 | 8/1980 | Zucchini et al. | 526/125 X |
| 4,285,834 | 8/1981 | Lowery et al. | 252/429 C |
| 4,325,837 | 4/1982 | Capshew et al. | 252/429 B |
| 5,032,651 | 7/1991 | McDaniel et al. | 526/96 |

FOREIGN PATENT DOCUMENTS

| | | |
|---|---|---|
| 0018108 | 10/1980 | European Pat. Off. . |
| 237294 | 9/1987 | European Pat. Off. . |
| 480375 | 4/1992 | European Pat. Off. . |
| 2338888 | 2/1975 | Fed. Rep. of Germany . |

Primary Examiner—Fred Teskin
Attorney, Agent, or Firm—Edward L. Bowman

[57] ABSTRACT

A catalyst mixture is disclosed comprising (1) a particulate chromium-containing catalyst comprising inorganic oxide and chromium and (2) a particular type of particulate titanium-containing catalyst. Also disclosed is the use of this catalyst mixture to produce particularly novel olefin polymers.

16 Claims, No Drawings

PROCESS FOR MAKING BIMODAL POLYOLEFINS USING TWO INDEPENDENT PARTICULATE CATALYSTS

FIELD OF THE INVENTION

The present invention relates to olefin polymerization. In another aspect, the present invention relates to catalysts for use in the polymerization of olefins. In still another aspect, the present invention relates to the polymerization of olefins using at least two independent particulate catalysts.

BACKGROUND OF THE INVENTION

Various techniques have been employed in the past for the polymerization of polymers and copolymers of olefins. One of the approaches has involved employing catalysts based upon transition metal compounds such as titanium. Another approach has involved the employment of catalysts containing chromium. As a general rule these two types of catalysts produce polyolefins having somewhat different physical characteristics. For some applications, it is desirable to have polyolefins which have a blend of the properties that are produced by the titanium and the chromium catalyst. An example of such polyolefin compositions include those which have been referred to as having bimodal molecular weight distributions. Some techniques for preparing such bimodal polymers have involved the use of multiple reactor arrangements, sometimes loops, sometimes stirred tanks in which different polymerization conditions such as temperature, hydrogen, or comonomer are employed in the different reaction zones. Such multiple reactor schemes, while offering versatility in resin characteristics, can be less efficient than would be desired. The control of the multiple reactor schemes is difficult and reactor size for one resin may by necessity be miss-sized for another. Another technique which has been used to make bimodal polyolefin compositions involves merely blending polyolefin resins having different characteristics; for example, in an extruder to obtain a reasonable homogeneous mixture.

In addition, some attempts have been made to combine titanium and chromium on a single catalyst. Examples of such catalyst systems are disclosed in U.S. Pat. No. 3,622,521 and U.S. Pat. No. 4,041,224, the disclosures of which are incorporated herein by reference.

In addition, U.S. Pat. No. 4,285,834 discloses carrying out the polymerization of olefins using a mixture of two independent supported catalysts, one of which contains titanium or vanadium and the other of which contains chromium. While the use of these catalyst mixtures produces some interesting polymers, there is still room for improvement. The improved properties of most bimodal polymers such as those produced by blending result not just from the broad characteristics of the bimodal molecular weight distribution. Instead it is believed that to obtain polymers having the most desirable combination of properties for many applications, it is desirable to obtain a polymer in which the branching is concentrated mainly in the high molecular weight portion of the molecular weight distribution.

An object of the present invention is to provide novel catalyst mixtures.

Another object of the present invention is to provide a process for the polymerization of olefins to produce polymers having a broad molecular weight distribution with the branching concentrated in the high molecular weight portion of the molecular weight distribution.

Another object of the present invention is to provide a mixed catalyst system which can be employed effectively in particle form polymerization of olefins.

Other aspects, objects and advantages of the present invention will become apparent to those skilled in the art having the benefit of this disclosure.

SUMMARY OF THE INVENTION

In accordance with the present invention there is provided a method for preparing an ethylene copolymer comprising contacting ethylene and at least one comonomer selected from alpha-olefins containing 3 to 18 carbon atoms in a liquid diluent under particle form polymerization conditions in the presence of a catalyst mixture comprising (1) a particulate chromium-containing catalyst and (2) a particulate titanium-containing catalyst, wherein under the polymerization conditions the chromium-containing catalyst is more effective in incorporating comonomer than the titanium-containing catalyst and produces higher molecular weight polymer than the titanium-containing catalyst.

Also in accordance with the present invention, there is provided a catalyst mixture suitable for the polymerization of ethylene. The catalyst mixture comprises (1) a particulate chromium-containing catalyst prepared by impregnating a low porosity silica with chromium, activating by contacting with oxygen at a temperature in the range of about 800° F. to about 1200° F., and then contacting the activated catalyst with carbon monoxide at a temperature in the range of about 500° F. to about 900° F. and (2) a particulate titanium-containing catalyst prepared by reacting a titanium alkoxide with a magnesium dihalide in a suitable liquid to obtain a solution, contacting said solution with a hydrocarbyl aluminum halide to produce a precipitate, contacting said precipitate first with titanium tetrachloride and then with a hydrocarbyl aluminum compound.

In an especially preferred embodiment the chromium-containing catalyst and the titanium-containing catalyst are each independently fed to the polymerization zone and the ratio of one catalyst to the other is used to control the melt index, density, and/or molecular weight distribution of the polymer.

DETAILED DESCRIPTION OF THE INVENTION

The Chromium Containing Catalyst

A large number of patents exists describing various chromium-containing catalysts. Some examples include those U.S. Pat. Nos. 3,887,494; 3,900,457; 4,053,436; 4,101,722; 4,150,208; 4,151,122; 4,294,724; 4,392,990; 4,405,501; 4,041,224; 3,622,521; 3,798,202, and 2,846,425, the disclosures of which are incorporated herein by reference.

The particular chromium catalyst employed can be readily selected by one skilled in the art after having the benefit of this disclosure. Preferably, a chromium catalyst is selected that is not particularly affected by hydrogen or by the small amounts of the cocatalyst that is used with the titanium-containing catalyst. Also, the chromium catalyst should be one which is more effective in incorporating comonomer than the titanium-containing catalyst under the selected polymerization conditions.

The amount of chromium in the catalysts can vary over a wide range. Any suitable catalytic amount could be employed. Typically, the chromium-containing catalyst will contain about 0.1 to about 10 weight percent chromium, more preferably about 0.1 to about 5 weight percent chromium. As a general rule, catalysts containing about 1 weight percent chromium are preferred. The term weight percent as used in this paragraph refers to weight percent chromium based on the weight of the chromium-containing catalyst.

The currently preferred chromium catalysts are low pore volume silica supported catalysts prepared by incorporating chromium on silica and activating in air at a temperature in the range of about 800° F. to about 1100° F. Preferably the Cr containing silica is then reduced with carbon monoxide at a temperature in the range of about 500° F. to about 900° F. Low pore volume catalysts suitable for such an activation and reduction process include catalysts which can be bought from W. R. Grace under the trade designations 9691D, 969MS, 968MS, and 967. Generally it is desirable to employ a catalyst having a porosity of no more than about 1.5 cc, more preferably no more than about 1.3 cc.

The Titanium Catalyst

The particular titanium-containing catalyst to be employed can readily be determined by those skilled in the art after having had the benefit of this disclosure.

A particularly preferred titanium catalyst that can be employed in the present invention is one of the type disclosed in a commonly owned European Patent Application 480,375 published Apr. 15, 1992, of which the present applicants are co-inventors. This titanium catalyst has been found to be particularly useful for the particle form polymerization when it is desirable to carry out the polymerization with low levels of organometallic cocatalysts.

Such a titanium catalyst is prepared by contacting a titanium alkoxide and a magnesium dihalide in a suitable liquid to produce a solution. The solution is then contacted with a suitable hydrocarbyl aluminum halide to obtain a solid. The solid, after possibly being contacted with olefin to form prepolymer, is contacted with titanium tetrachloride and then the resulting solid is contacted with a hydrocarbyl aluminum compound prior to the introduction of the solid into a polymerization vessel.

Examples of the titanium alkoxides include the titanium tetraalkoxides in which the alkyl groups contain 1 to about 10 carbon atoms each. Some specific examples include titanium tetramethoxide, titanium dimethoxide diethoxide, titanium tetraethoxide, titanium tetra-n-butoxide, titanium tetrahexyloxide, titanium tetradecyloxide, and titanium cyclohexyloxide.

The magnesium dihalide is preferably magnesium chloride.

The titanium alkoxide and the magnesium dihalide can be combined in any suitable liquid. Examples include substantially anhydrous organic liquids such as n-pentane, n-hexane, n-heptane, methylcyclohexane, toluene, xylenes, and the like.

The molar ratio of the transition metal compound to the metal halide can be selected over a relatively broad range. Generally, the molar ratio is within the range of about 10 to 1 to about 1 to 10, preferably between about 3 to 1 to about 0.5 to 2; however, more often the molar ratios are within the range of about 2 to 1 to about 1 to 2.

Generally, it is desirable to heat the liquid mixture to obtain a solution. Generally, the components are mixed at a temperature in the range of about 15° C. to about 150° C. The mixing could be carried out at atmospheric pressure or at higher pressures.

The time required for mixing the two components is any suitable time which will result in a solution. Generally, this would be a time within the range of about 5 minutes to about 10 hours. Following the mixing operation, the resulting solution can be filtered to remove any undissolved material or extraneous solid, if desired.

The precipitating agent is selected from the group consisting of hydrocarbyl aluminum halides. Preferably the hydrocarbyl aluminum halide is selected from compounds of the formula $R_mAlX_{3-m}$ wherein R is a hydrocarbyl group having 1 to 8 carbons, X is a halogen, and m is a number in the range of 1 to 3. Some specific examples of such compounds include ethylaluminum sesquichloride, diethylaluminum chloride, and ethylaluminum dichloride.

The amount of precipitating agent employed can be selected over a relatively broad range depending upon the particular activities desired. Generally, the molar ratio of the transition metal of the titanium-containing component to the precipitating agent is within the range of from about 10 to 1 to about 1 to 10 and more generally within the range of about 2 to 1 to about 1 to 3.

In especially preferred embodiments the catalyst contains an amount of prepolymer sufficient to improve the particle size of the catalyst and ultimately the size of the polymer particles produced in a polymerization reaction.

One way of forming prepolymer involves conducting the precipitation in the presence of an aliphatic mono-1-olefin. Another technique involves contacting the precipitated solid with an aliphatic mono-1-olefin under suitable conditions to form prepolymer, either before or after the treatment with titanium tetrachloride. Examples of olefins which can be used for forming prepolymer include ethylene, propylene, 1-butene, 1-pentene, 1-hexene, 1-heptene, 3-methyl-1-pentene, 1-heptene, 1-octene, and the like and mixtures of one or more thereof. The weight of prepolymer based on the total weight of the final prepolymerized catalyst is generally in the range of from about 1 to about 50 weight percent, more preferably about 1 to about 20 weight percent, and still more preferably about 5 to about 10 weight percent.

The precipitated solid, either with or without prepolymer, is contacted with titanium tetrachloride. The relative ratios of the titanium tetrachloride to the solid can vary over a wide range; however, as a general rule, the weight ratio of the titanium tetrachloride to the prepolymerized or unprepolymerized solid would generally be within the range of about 10 to 1 to about 1 to 10, more generally about 7 to 1 to about 1 to 4.

Preferably after the precipitated solid is contacted with TiCl$_4$, it is washed several times with a hydrocarbon that acts as a solvent for the TiCl$_4$.

The pretreatment of the catalyst with the hydrocarbyl aluminum compound prior to the introduction of the catalyst into the polymerization zone is preferably carried out in a substantially inert liquid, generally a hydrocarbon.

The hydrocarbyl aluminum compound that is contacted with the titanium-containing solid catalyst can be selected from generally any of those type of hydrocarbyl aluminum reducing agents that have in the past been used as cocatalysts with such titanium-containing catalysts. The currently preferred organometallic reducing agents are selected from compounds of the formula $R_mAlZ_{3-m}$ wherein R is a hydrocarbyl group having 1 to 8 carbons, Z is a halogen, hydrogen, or hydrocarbyl group having 1 to 8 carbons, and m is a number in the range of 1 to 3. Examples include organo-aluminum compounds such as triethylaluminum, trimethylaluminum, diethylaluminum chloride, ethylaluminum dichloride, ethylaluminum sesquichloride, methylaluminum sesquichloride, triisopropylaluminum, dimethylaluminum chloride, tridecylaluminum, trieicosylaluminum, tricyclohexylaluminum, triphenylaluminum, 2-methylpentyldiethylaluminum, triisoprenylaluminum, methylaluminum dibromide, ethylaluminum diiodide, isobutylaluminum dichloride, dodecylaluminum dibromide, dimethylaluminum bromide, diisopropylaluminum chloride, methyl-n-propylaluminum bromide, di-n-octylaluminum bromide, diphenylaluminum chloride, dicyclohexylaluminum bromide, methylaluminum sesquibromide, ethylaluminum sesquiiodide, and the like and mixtures thereof. The currently most preferred organometallic reducing agents are selected from trialkylaluminum compounds, especially triethylaluminum. Preferably each R is an alkyl group containing 1 to 4 carbon atoms.

The amount of reducing agent employed in pretreating the titanium-containing catalyst can vary over a wide range. The optimum amount needed for the best overall improvement in the particle form polymerization can be determined by routine experimentation. Generally, excess organometallic reducing agent can be used; however, in such cases it is desirable to subject the resulting product to a number of washes with a suitable solvent, for example a hydrocarbon, to assure that soluble organometallic reducing agent is removed from the catalyst prior to the introduction of the catalyst into the polymerization process. More preferably, the organometallic reducing agent is employed in an amount such that the molar ratio of the reducing agent to titanium in the catalyst would be in the range of about 0.01:1 to about 10:1, still more preferably about 0.02:1 to about 3:1. Here again it is generally desirable to subject the resulting catalyst to a wash treatment if the catalyst contains a significant amount of soluble reducing agent.

Preferably conditions are employed in all the catalyst preparation steps to minimize the presence of oxygen and water. The contacting can be carried out over a broad range of temperature conditions. Typically, the contacting of the titanium solid and the hydrocarbyl aluminum compound would be conducted at a temperature in the range of about 15° C. to about 150° C., more typically, about 20° C. to about 100° C. After the contacting, the mother liquor is generally decanted and the resulting solids washed several times with a suitable liquid solvent such as a hydrocarbon.

The resulting pretreated catalyst may if desired be mixed with a particulate diluent such as, for example, silica, silica-alumina, silica-titania, magnesium dichloride, magnesium oxide, polyethylene, polypropylene, and poly(phenylene sulfide), prior to the use of the catalyst in a polymerization process. The weight ratio of the particulate diluent to the catalyst can be varied over a wide range. Typically, the weight ratio of the particulate diluent to the catalyst is generally within the range of about 100 to 1 to about 1 to 100, or more often in the range of about 20 to 1 to about 2 to 1. The use of a particulate diluent has been found to be particularly effective in facilitating the controlled charging of the catalyst to the reactor.

Examples of titanium-containing catalysts which could be pretreated with a hydrocarbyl aluminum compound to yield a titanium-containing catalyst that can be used in combination with the chromium-containing catalyst in accordance with the present invention include prepolymerized titanium catalysts of the type disclosed in U.S. Pat. No. 4,325,837, the disclosure of which is incorporated herein by reference.

Catalyst Ratios

The ratios of the particulate titanium catalyst to the particulate chromium catalyst can vary over a wide range depending upon the particular properties desired. As a general rule, the weight ratio of the titanium catalyst to the chromium catalyst would be in the range of about 99:1 to about 1:99, more preferably about 80:20 to about 20:80. Preferably the catalysts are used in amounts such that each is responsible for 25 to 75 weight percent of the polymer produced.

Monomers

The invention is considered suitable for the copolymerization of ethylene with a wide range of olefins, particularly those aliphatic alpha monoolefins and alpha diolefins having 3 to about 18 carbon atoms. Some examples of such alpha olefins include propylene, butene-1, butadiene, pentene, 3-methylbutene-1, 4-methylpentene-1, hexene-1, octene-1, dodecene-1, octadecene-1, 1,7-octadiene, and mixtures thereof and the like.

The amount of alpha olefin comonomer can vary over a wide range. Typically the molar ratio of the comonomer to ethylene would be in the range of about 99:1 to about 1:99, more generally about 25:75 to about 1:99.

The invention is particularly useful for the polymerization of ethylene in combination with small amounts of higher alpha olefins such as butene-1 or hexene-1, generally in amounts of less than 20 weight % based on the weight of the ethylene.

Polymerization Conditions

The inventive polymerization process involves carrying out the olefin polymerization under particle form polymerization conditions. Typically, this requires the employment of polymerization temperatures in the range of from about 60° C. to about 110° C., more preferably about 70° C. to about 90° C. The reaction can be conducted in a batch reactor or in a suitable continuous reactor. It is generally preferable to carry out the polymerization in an elongated reaction tube which is contacted externally with suitable cooling media to maintain the desired polymerization temperature. A preferred technique uses loop reactor in which the reaction mixture and polymer is circulated within a pipe loop. The time involved for the polymerization will vary depending upon the particular catalyst mixture employed, the temperature, and the desired type of polymer. Typically, when the polymerization is conducted on a commercial scale the residence time is in the range of about ½ hour to about 2 hours.

It is generally desirable to carry out the polymerization in the absence of moisture and oxygen. As a general rule the polymerization is conducted in the presence of a suitable liquid diluent. Examples of such diluents include isobutane, n-butane, n-hexane, isooctane, cyclohexane, methylcyclopentane, dimethylcyclohexane, and the like.

The polymerization pressures are generally in the range of from about 110 to about 700 psia, or higher. Typically total Cr and Ti catalyst concentrations would be in the range of about 0.001 to about 1 weight percent based on the total weight of the polymerization reaction mixture.

In order to obtain polymers with particularly desirable physical properties it is desirable to employ hydrogen during the polymerization period. The amount of hydrogen employed can vary over a wide range depending upon the particular results desired. Typically, the hydrogen would be employed in an amount in the range of about 0.5 to about 5, more preferably about 1.5 to about 2.5 mole percent based on the weight of the polymerization diluent.

As a general rule it is advantageous to use the mixed catalyst system in combination with a small but effective activating amount of an organometallic cocatalyst. Such organometallic cocatalyst are those of the general type which have in the past been used in activating transition metal containing catalyst systems such as those based upon titanium. Examples of such cocatalyst thus include organic aluminum compounds such as trihydrocarbyl aluminum compounds. Triethylaluminum is a currently favored cocatalyst. The amount of cocatalyst employed can vary over a wide range but generally it is desirable to limit its use so that the liquid polymerization diluent does not contain more than about 20 ppm of the cocatalyst, more preferably less than 10 ppm. The applicants have observed that, particularly in particle form polymerization the higher levels of cocatalyst tend to deactivate the chromium portion of the catalyst mixture.

One of the advantages of the particulate titanium catalyst employed in the present invention is that it can be effective even though the level of cocatalyst such as trialkylaluminum is very low.

The polymer is readily recovered from the polymerization mixture by driving off unreacted monomor and liquid diluent. As a general rule, no further removal of impurities is required. In some instances, however, it may be desirable to add a small amount of a catalyst deactivating reagent of the types conventionally employed for deactivating titanium type catalysts.

A further understanding of the present invention and its objects and advantages will be provided by the following examples.

In the following examples the particulate titanium catalyst was prepared by reacting titanium tetraethoxide with magnesium dichloride to produce a solution. The solution was then contacted with an alkylaluminum halide to obtain a precipitate. Ethylene prepolymer was deposited upon the solid and then the solid was treated with titanium tetrachloride and then washed with a hydrocarbon. A hydrocarbon slurry of the resulting solid was then contacted with triethylaluminum and washed several times with a hydrocarbon to remove soluble triethylaluminum. In order to have a catalyst which would feed well in the equipment being used, the titanium catalyst was admixed with calcined silica.

The chromium catalysts used in the following examples were 951 silica supported chromium catalysts which activated in air at 1000° F. and then reduced with carbon monoxide at 700° F. prior to use. The chromium catalysts contained about 1 weight percent chromium, based on the total weight of the catalyst.

The experiments set forth in the following examples were carried out using an 87 liter, 15.2 cm diameter pipe loop reactor. Two catalyst mud pipes were employed each with its own catalyst feeder for independent control of the particulate titanium catalyst and the particulate chromium catalyst.

EXAMPLE I

A series of polymerization reactions were carried out using different levels of the titanium and the chromium catalysts to determine the effects of the inventive catalyst mixtures. The polymerizations were conducted at 180° F., about 1.5 to about 2 mole percent hydrogen, about 5 to 10 parts per million triethylaluminum cocatalyst, and 1-hexene was used as a comonomer along with the ethylene. The amount of hexene feed was about 15 weight % based on the weight of the ethylene feed. The variations in the polymerization runs and the effects on the resulting polymers are summarized in Table 1.

TABLE I

| Resins Produced with Varied XPF/Cr Ratios | | | | | |
|---|---|---|---|---|---|
| | Catalyst, % | | | | |
| Resin | Ti | Cr | HL(MI) | Density | HI |
| 1 | 100 | 0 | (42) | 0.959 | 6 |
| 2 | 65 | 35 | 81 | 0.950 | 23 |
| 3 | 50 | 50 | 33 | 0.948 | 28 |
| 4 | 40 | 60 | 22 | 0.947 | 26 |
| 5 | 35 | 65 | 5 | 0.942 | 31 |
| 6 | 20 | 80 | 1 | 0.940 | 37 |
| 7 | 0 | 100 | 2 | 0.939 | 41 |

Table I shows that when the titanium catalyst was used alone, a polymer was obtained which had a melt index of 42 and a density of 0.959. In contrast when all of the catalyst was the particulate chromium-containing catalyst, a polymer was obtained having a high load melt index of 2 and a density of 0.939. The data thus shows that the use of the titanium catalyst alone yields a polymer having an average molecular weight somewhat lower than that of the polymer produced when the catalyst was totally the chromium catalyst. In addition the heterogeneity index (HI) of the polymer formed using only the titanium catalyst was much lower than that of the polymer produced using only the chromium catalyst. This demonstrates that as is known in the art titanium catalysts produce a generally lower molecular weight, narrower molecular weight distribution polymer than do the chromium catalysts. The data reveals further that by using mixtures of the titanium catalyst and the chromium catalyst, in accordance with the present inventon, it is possible to both vary the density of the resulting polymer, the molecular weight of the polymer, and the molecular weight distribution. As the chromium component was increased the molecular weight distribution of the polymer was broadened. These polymers were subjected to size exclusion chromatography for a further study of the molecular weight distribution. While the molecular weight distribution of the polymers produced using mixtures of the catalysts remained relatively broad, it was apparent that the peaks of the molecular weight distribution were shifted to lower molecular weight products. This illustrates that both the titanium and the chromium catalysts are contributing, to result in polymers which can be viewed as bimodal, i.e. having molecular weight distribution contributions of both the titanium and the chromium catalysts.

An additional polymerization run was conducted using the same catalyst as was used for Resin 3 in Table I. The reactor conditions, except for temperature, were the same as for the other runs in Table I. This polymerization run differed from that used in making Resin 3 only in that the polymerization was conducted at 190° F. rather than 180° F. The higher temperature resulted in a slightly narrower molecular weight distribution as evidenced by a heterogeneity index of 24 versus that of 28 for Resin 3. In addition, the higher reactor temperature resulted in a polymer having a somewhat higher high load melt index, specifically a high load melt index of 56 as compared to the high load melt index 33 of Resin 3. This illustrates that by varying the temperature one can make changes in the melt index molecular weight distribution or density of the polymer. In this case the resin produced at 190° F. had a density of 0.946 as compared to the 0.948 density of Resin 3.

EXAMPLE II

Certain of the polymers from Example I were compounded using a typical bottle resin recipe including antioxidants and the like. Two additional polymerization runs were conducted using a commercial chromium-containing catalyst sold by W. R. Grace as 969 MS. These polymers were also compounded using a typical bottle resin recipe.

The polymerization variables and the properties of the polymer compositions are summarized in Table II. Table II further contains the physical properties of a typical bottle composition prepared from a typical commercial scale polymer produced using a chromium catalyst.

EXAMPLE III

Another pilot plant polymerization run was carried out using the above-described inventive titanium/chromium mixed particulate catalysts in an attempt to make a polyethylene copolymer comparable to the commercial scale polymers often employed in making plastic pipe. The polymerization conditions are summarized in Table III. For comparison purposes the physical properties of a typical commercial scale pipe resin are included as a control. Both the inventive polymer and the commercial scale polymer were used to make typical natural color pipe compositions.

TABLE III

| Pipe Resin (Natural, Not Black), Two Catalyst Feeders | | |
|---|---|---|
| | Run | |
| | 13 | Control |
| Catalyst, Ti/Cr | 45/55 | Cr |
| Reactor Temp., °F. | 180 | — |
| H$_2$, mol % | 1.54 | — |
| C$_6$=$^1$, wt. % of C$_2$=$^{(1)}$ | 15.2 | — |
| TEA, ppm | 4 | — |
| HLMI, pellet | 9 | 11 |
| Density | 0.946 | 0.945 |
| Productivity (ash)$^{(2)}$ | 2560 | — |
| PTC Results (1"pipe) | | |
| Flex. Mod., Kpsi (D3350) | 104 | 87 |
| Tensile Yield, psi | 3200 | 3150 |
| Tensile Break, psi | 3550 | 5650 |
| Elongation, % | 530 | 880 |
| ESCR, C (milled), hrs. | >2400 | >1000 |

$^{(1)}$C$_2$= = 7-8 mol. %
$^{(2)}$Residence Time = 75 min.

The data in Table III shows that the catalyst pro-

TABLE II

| | Bottle Resins From Two Catalyst Feeders | | | | Commercial Scale Resin |
|---|---|---|---|---|---|
| Run | 9 | 10 | 11 | 12 | |
| Catalyst, Ti/Cr | 65/35 | 50/50 | 969 MS | 969 MS | Cr |
| Reactor Temp., °F. | 180 | 180 | 212 | 216 | — |
| H$_2$, mol % | 1.60 | 1.71 | 0.22 | 0.26 | — |
| C$_6$=$^1$, wt. % of C$_2$=$^{(1)}$ | 15.3 | 14.8 | 1.8 | 1.5 | — |
| TEA, ppm | 4.5 | 4.7 | 0 | 0 | 0 |
| MI, pellet | 0.44 | 0.17 | 0.43 | 0.26 | 0.32 |
| HLMI/MI | 122 | 165 | 86 | 126 | 100 |
| Density | 0.952 | 0.950 | 0.951 | 0.953 | 0.952 |
| Productivity (ash)$^{(2)}$ | 2860 | 2380 | 1530 | 2150 | — |
| Bell ESCR, hrs. | >1000 | >1000 | 112 | 52 | — |
| PTC Results (105 g. bottle) | | | | | |
| ESCR (Orvusk), hrs. | 650 | >700 | 130 | 80 | 130 |
| Impact, ft. | 9 | >12 | >12 | 7 | >12 |
| Die Swell (bottom layflat) | 5.58 | 5.65 | 5.40 | 5.20 | 5.45 |

$^{(1)}$C$_2$= = 7-8 mol. %
$^{(2)}$Residence Time = 75 min.

The data in Table II shows that higher titanium to chromium ratios in the inventive mixture produces a higher melt index, higher density polymer. Also the molecular weight distribution as reflected by HLMI/MI narrows as the titanium component was increased. Certain properties of the bottle compositions produced using the polymer obtained with the inventive catalyst mixture were comparable to those of the compositions produced using the typical bottle resin which was made in a commercial scale plant. Runs 11 and 12 used the 969 MS catalyst in the pilot plant reactor. It is notable that the bell and bottle ESCR values of the resins produced using the inventive mixed catslyst systems are dramatically higher than those of the resins produced using the MS catalyst.

duced with the inventive catalyst system has physical properties that are generally comparable to those of the commercial scale pipe resin. It is important to note that the polymer produced with the inventive catalyst composition did exhibit significantly improved environmental stress crack resistance.

EXAMPLE IV

Another series of runs were conducted using the above-described Ti/Cr catalysts in an attempt to produce polymers which would be suitable for the production of films. The resulting polymers were compounded with the following stabilizers and antioxidants: BHT 0.06, DLTDP 0.03 weight percent, Ultranox 626 0.05 weight percent, and zinc stearate 0.05 weight percent based on the total weight of the polymer. Run 17 differs in that in that case the polymer was also compounded with 0.05 weight percent of FX 9613, a fluoroelastomer. The polymerization variables, the polymer properties, and the composition properties are summarized in Table IV.

TABLE IV

Film Resins From Two-Catalyst Feeder Studies

| | Run | | | | |
|---|---|---|---|---|---|
| | 14 | 15 | 16 | 17[1] | Control |
| Catalyst, Ti/Cr | 50/50 | 50/50 | 50/50 | 36/64 | |
| Reactor Temp., F. | 190 | 190 | 180 | 180 | |
| $H_2$, mol. % | 1.52 | 1.49 | 1.71 | 1.57 | |
| $C_6=1$, wt. % of $C_2=$ [2] | 14.9 | 15.1 | 14.8 | 14.2 | |
| TEA, ppm[3] | 5 | 6 | 5 | 4 | |
| HL(MI), pellet | 17 | 32 | 28 | 3 | (0.28) |
| HLMI/MI | 170 | 154 | 165 | — | |
| Density | 0.946 | 0.946 | 0.950 | 0.945 | 0.939 |
| Fluff Bulk Density, lbs/ft$^3$ | 25.9 | 25.2 | 24.4 | 22.9 | |
| Productivity (ash)[4] | 2380 | 2270 | 2380 | 2040 | |
| R&D Film Evaluation (1-mil @ 75 rpm) | | | | | |
| Dart Impact, g | 121 | 118 | 79 | 260 | 130 |
| Tear, g | | | | | |
| MD | 21 | 32 | 23 | 41 | 57 |
| TD | 483 | 509 | 448 | 157 | 426 |

[1]Extruded w/fluoroelastomer
[2]$C_2= $ = 7–8 mol %
[3]Based on isobutane feedrate
[4]Polymer residence time = 75 min.

The data in Table IV shows that higher polymerization temperatures appear to help the incorporation of the 1-hexene comonomer into the polymer chain as evidenced by the lower density for the resin in Runs 14 and 15 when compared with that of Run 16. The data also reveals that the chromium catalyst appears to incorporate 1-hexene more easily than the titanium catalyst. Accordingly the higher the level of particulate chromium catalyst in the dual catalyst system, the lower the density of the polymers produced. The film properties for the experimentally produced resins were compared with a commercial scale produced film resin composition. The properties of the film compositions were generally comparable.

That which is claimed is:

1. A process for preparing an ethylene copolymer in a particle form polymerization using a mixture of a particulate titanium-containing catalyst and a particulate chromium-containing catalyst wherein the molecular weight distribution of the resulting copolymer is broader than that of a copolymer obtained under the same conditions using only the titanium-containing catalyst and wherein the average molecular weight of the resulting copolymer is lower than that of a copolymer obtained using only the chromium-containing catalyst under the same conditions, said process comprising, contacting ethylene and at least one comonomer selected from alpha-olefins containing 3 to 18 carbon atoms in a liquid diluent under particle form polymerization conditions in the presence of said mixture of catalysts and an organometallic cocatalyst for the titanium-containing catalyst, wherein said liquid diluent contains no more than about 20 parts per million of said organometallic cocatalyst, wherein the polymerization is conducted at a temperature no greater than about 110° C., wherein the particulate chromium-containing catalyst would if used alone under the same polymerization conditions produce a copolymer having a higher average molecular weight than the titanium-based catalyst, and wherein the particulate titanium-based catalyst is prepared by reacting a titanium alkoxide with a magnesium dihalide in a suitable liquid to obtain a solution, contacting said solution with a hydrocarbylaluminum halide to produce a precipitate, contacting said precipitate with titanium tetrachloride, and then contacting the resulting solid with a hydrocarbylaluminum compound.

2. A process for preparing an ethylene copolymer in a particle form polymerization using a mixture of a particulate titanium-containing catalyst and a particulate chromium-containing catalyst wherein the molecular weight distribution of the resulting copolymer is broader than that of a copolymer obtained under the same conditions using only the titanium-containing catalyst and wherein the average molecular weight of the resulting copolymer is lower than that of a copolymer obtained using only the chromium-containing catalyst under the same conditions, said process comprising, contacting ethylene and at least one comonomer selected from alpha-olefins containing 3 to 18 carbon atoms in a liquid diluent under particle form polymerization conditions in the presence of said mixture of catalysts and triethylaluminum, an organometallic cocatalyst for the titanium-containing catalyst, wherein said liquid diluent contains no more than about 20 parts per million of said triethylaluminum, wherein the polymerization is conducted at a temperature no greater than about 110° C., wherein the particulate chromium-containing catalyst would if used alone under the same polymerization conditions produce a copolymer having a higher average molecular weight than the titanium-based catalyst, and wherein the particulate titanium-based catalyst being a low pore volume catalyst comprising silica, said chromium-containing catalyst having been first activated in air at a temperature in the range of about 800° F. to about 1100° F. and then reduced with carbon monoxide at a temperature in the range of about 500° F. to about 900° F., and wherein the particulate titanium-based catalyst is prepared by reacting a titanium tetraethoxide with a magnesium dihalide in a suitable liquid to obtain a solution, contacting said solution with a hydrocarbylaluminum halide of the formula $R_mAlX_{3-m}$ wherein m is a number in the range of 1 to 2 and R is a hydrocarbyl group having 1 to 8 carbon atoms and X is a halogen, to produce a precipitate, forming prepolymer on the precipitate, contacting said prepolymerized precipitate with titanium tetrachloride, and then contacting the resulting solid with a hydrocarbylaluminum compound, said process further being characterized by the fact that said cocatalyst comprises triethylaluminum.

3. A process according to claim 2, wherein said chromium-containing catalyst is prepared by incorporating chromium on silica and activating in air at a temperature in the range of from about 800° F. to about 1100° F. and then reducing the resulting chromium-containing silica with carbon monoxide at a temperature in the range of from about 500° F. to about 900° F.

4. A process according to claim 3 wherein said precipitating agent is selected from ethylaluminum sesquichloride, diethylaluminum chloride, and ethylaluminum dichloride.

5. A process according to claim 1 wherein the major olefin in terms of molar ratios is ethylene.

6. A process according to claim 5 wherein said titanium-containing catalyst is prepared by reacting titanium tetraethoxide and magnesium dichloride in a suitable liquid to obtain a solution, contacting said solution with ethylaluminum sesquichloride to obtain a precipitate, treating the precipitate with titanium tetrachloride and then with triethylaluminum.

7. A process according to claim 6 wherein said titanium-containing catalyst contains olefinic prepolymer.

8. A process according to claim 7 wherein said olefinic prepolymer is deposited on the titanium-containing catalyst before the solid is contacted with titanium tetrachloride.

9. A process according to claim 8 wherein the chromium catalyst contains about 0.1 to about 10 weight percent chromium.

10. A process according to claim 6 wherein the olefins that are copolymerized comprise ethylene and 1-hexene.

11. A process according to claim 10 wherein the polymerization is conducted in the presence of hydrogen and a small but effective amount of a 12. A process according to claim 5 wherein the titanium-containing catalyst is prepared by reacting a titanium tetraalkoxide selected from those having alkyl groups having 1 to 10 carbon atoms with magnesium dichloride, in a suitable liquid to obtain a solution, contacting said solution with a hydrocarbyl aluminum halide selected from compounds of the formula $R_mAlX_{3-m}$ where R is an alkyl group having 1 to 8 carbons, X is chloride, and m is a number in the range of 1 to 5, to obtain a precipitate, treating the precipitate with titanium tetrachloride and then with a trialkylaluminum in which the alkyl groups contain 1 to 4 carbon atoms.

13. A process according to claim 12 wherein the weight ratio of the titanium catalyst to the chromium catalyst is in the range of from about 99:1 to about 1:99.

14. A process according to claim 12 wherein the weight ratio of the titanium catalyst to the chromium catalyst is in the range of about 80:20 to about 20:80.

15. A process according to claim 14 wherein the polymerization is conducted in the presence of a small but effective amount of a cocatalyst comprising triethylaluminum.

16. A process according to claim 15 wherein said chromium catalyst and said titanium catalyst are independently fed into the polymerization zone and the ratio of the chromium catalyst to the titanium catalyst is used to control the melt index, density, and/or the molecular weight distribution of the produced copolymer.

* * * * *

UNITED STATES PATENT AND TRADEMARK OFFICE
CERTIFICATE OF CORRECTION

PATENT NO. : 5,237,025
DATED : August 17, 1993
INVENTOR(S) : Elizabeth A. Benham and Max P. McDaniel It is certified that error appears in the above-identified patent and that said Letters Patent is hereby corrected as shown below:

Column 12, line 44, after "catalyst", please delete "and wherein the particulate titanium-based", and insert therefor ---said chromium-containing---.

Column 12, line 62, please delete "hydrocarbylaluminum" and insert therefor ---triethylaluminum---.

Column 14, line 3, after "amount of a", please insert ---cocatalyst comprising triethylaluminum---.

Column 14, line 13, please delete "5", and insert therefor ---2---.

Signed and Sealed this

Fifteenth Day of March, 1994

Attest:

BRUCE LEHMAN

Attesting Officer

Commissioner of Patents and Trademarks